(12) United States Patent
Weitzel et al.

(10) Patent No.: US 8,153,735 B2
(45) Date of Patent: Apr. 10, 2012

(54) CONTINUOUS POLYMERIZATION PROCESS

(75) Inventors: Hans-Peter Weitzel, Reischach (DE); Robert Braunsperger, Emmerting (DE)

(73) Assignee: Wacker Chemie AG, Munich (DE)

( * ) Notice: Subject to any disclaimer, the term of this patent is extended or adjusted under 35 U.S.C. 154(b) by 151 days.

(21) Appl. No.: 12/673,395

(22) PCT Filed: Aug. 11, 2008

(86) PCT No.: PCT/EP2008/060502
§ 371 (c)(1),
(2), (4) Date: Feb. 16, 2010

(87) PCT Pub. No.: WO2009/021930
PCT Pub. Date: Feb. 19, 2009

(65) Prior Publication Data
US 2011/0213073 A1 Sep. 1, 2011

(30) Foreign Application Priority Data
Aug. 14, 2007 (DE) .................. 10 2007 038 332

(51) Int. Cl.
*C08F 2/22* (2006.01)
*B01J 19/18* (2006.01)
*C08F 218/04* (2006.01)

(52) U.S. Cl. ............ 526/65; 526/87; 526/331; 524/819; 422/134; 528/502 E

(58) Field of Classification Search .................. 524/819; 526/65, 331, 87; 422/134; 528/502 E
See application file for complete search history.

(56) References Cited

U.S. PATENT DOCUMENTS

| | | | |
|---|---|---|---|
| 2,703,794 A | 3/1955 | Roedel | |
| 3,551,396 A | 12/1970 | Pierrefonds | |
| 3,875,128 A | 4/1975 | Suzuki et al. | |
| 4,022,744 A | 5/1977 | D'Achille et al. | |
| 4,035,329 A | 7/1977 | Wiest et al. | |
| 4,164,489 A | 8/1979 | Daniels et al. | |
| 4,211,751 A | 7/1980 | Keggenhoff et al. | |
| 4,487,898 A | 12/1984 | Kato et al. | |
| 5,331,055 A | 7/1994 | Fujiwara et al. | |
| 6,660,814 B1 | 12/2003 | Kröner et al. | |
| 6,664,322 B2 | 12/2003 | Weitzel | |

(Continued)

FOREIGN PATENT DOCUMENTS
DE  2555142  6/1976

(Continued)

OTHER PUBLICATIONS

Fox, T. G.; #J5—"Influence of Diluent and of Copolymer Composition on the Glass Temperature of a Polymer System"; Bulletin American Physics Society; vol. 1; 1956; p. 123 (1 p).

(Continued)

*Primary Examiner* — Fred M Teskin
(74) *Attorney, Agent, or Firm* — RatnerPrestia

(57) ABSTRACT

The invention provides a process for preparing polymers based on vinyl ester, ethylene and optionally further comonomers in the form of aqueous polymer dispersions thereof or of water-redispersible polymer powders by means of free-radically initiated continuous emulsion polymerization and optionally drying of the resulting polymer dispersions, characterized in that the emulsion polymerization is carried out in a cascade comprising at least one upstream heat exchanger and at least two downstream pressurized stirred tank reactors connected in series, such that the conversion on leaving the heat exchanger is at least 10% of the overall polymerization conversion.

14 Claims, 1 Drawing Sheet

U.S. PATENT DOCUMENTS

| | | |
|---|---|---|
| 2002/0035192 A1 | 3/2002 | Weitzel |
| 2003/0040570 A1 | 2/2003 | Nestler |
| 2003/0125451 A1 | 7/2003 | Weitzel et al. |
| 2004/0048969 A1 | 3/2004 | Kirsch et al. |
| 2004/0085853 A1 | 5/2004 | Kohlgruber et al. |
| 2005/0261423 A1 | 11/2005 | Funkhauser et al. |

FOREIGN PATENT DOCUMENTS

| | | |
|---|---|---|
| DE | 2456576 | 8/1976 |
| EP | 0072165 | 2/1983 |
| EP | 0834518 | 4/1998 |
| EP | 1067147 | 1/2001 |
| EP | 1174445 | 1/2002 |
| EP | 1323752 | 7/2003 |
| EP | 1384502 | 1/2004 |
| WO | WO 02/059158 | 8/2002 |
| WO | WO 03/006510 | 1/2003 |

OTHER PUBLICATIONS

Lee, W. A. & Rutherford, R. A.; "The Glass Transition Temperatures of Polymers"; Polymer Handbook, $2^{nd}$ Edition; 1975; 53 pp.; J. Wiley & Sons, New York.

Gold, Josef; "International Search Report"; Nov. 25, 2008; 3 pp; European Patent Office, Rijswijk, The Netherlands.

Petrocelli, Francis P., et al.; "Continuous Process for the Production of Vinyl Acetate-Ethylene Emulsion Copolymers"; Poly. Sci. Eng.; vol. 80; pp. 544-545; Wiley Science, New York, (1999).

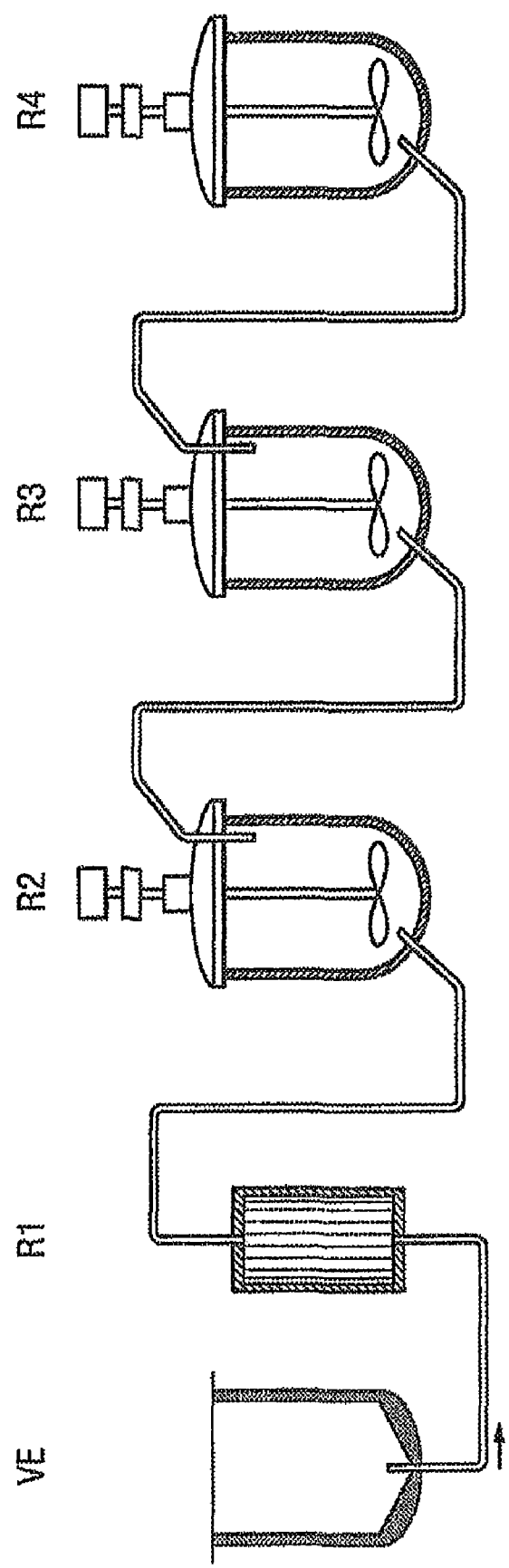

CONTINUOUS POLYMERIZATION PROCESS

CROSS REFERENCE TO RELATED APPLICATIONS

This application is the National Phase filing of PCT application number EP/2008/060502, filed 11 Aug. 2008, and claims priority of German patent application number DE102007038332.2, filed 14 Aug. 2007, the entire disclosures of which applications are incorporated herein by reference.

FIELD OF THE INVENTION

The invention relates to a process for the preparation of protective colloid-stabilized polymers based on vinyl esters, ethylene and optionally further comonomers in the form of their aqueous polymer dispersions or water-redispersible polymer powder by means of continuous emulsion polymerization and optionally drying of the aqueous polymer dispersions obtained thereby.

BACKGROUND OF THE INVENTION

Protective colloid-stabilized polymers are used especially in the form of their aqueous dispersions or water-redispersible polymer powder in many kinds of applications, for example as coating materials or adhesives, for a very wide range of substrates. Protective colloids used are as a rule polyvinyl alcohols. The use of polyvinyl alcohol is worthwhile because, in comparison with systems which are stabilized by low molecular weight compounds (emulsifiers), it itself contributes to the strength (e.g. adhesive strength values in tile adhesive). To date, vinyl esters and ethylene have preferably been used as monomers for the preparation of redispersible powders since stabilization of acrylate copolymers or styrene-acrylate copolymers by polyvinyl alcohol is not easy to accomplish.

The preparation of these dispersions is traditionally effected by emulsion polymerization in the batch process. This procedure is distinguished by high flexibility and is thus preferably to be encountered in plants with a large variety of products. In addition, this procedure is substantially less demanding than a continuous process in terms of process engineering. A disadvantage is the substantially lower cost-efficiency of the batch process in comparison with the continuous process.

The continuous process is thus the correct choice for plants with a high output in combination with a small variety of products. A key problem in the case of the continuous emulsion polymerization is establishing the correct conditions for permanent nucleation of new latex particles. The favoured plant configuration is the stored tank cascade because such reactors are already used in batch operation and would thus be capable of being used with only little economic conversion effort for the continuous process. Usually, more or less pronounced variation of the product properties and of the process parameters is encountered, which in the extreme case may lead to unusable products or damage to the plant.

U.S. Pat. No. 2,703,794 describes a process for the continuous emulsion polymerization of vinyl acetate and ethylene in the presence of an emulsifier and optionally water-miscible organic solvents, water, emulsifier, monomers and initiator being metered in simultaneously and continuously. The process is carried out without seed latex and in a single pressure-resistant reactor. Pronounced deposits on the reactor wall and varying particle sizes are disadvantageous.

U.S. Pat. No. 3,551,396 describes a process for the preparation of vinyl acetate homopolymer dispersions in a loop reactor, in which monomer and water are continuously circulated, additional monomer and initiator being metered in continuously and polymer formed being removed continuously from the reactor. The polymerization is carried out without seed latex and in a single pressure-resistant reactor.

DE-A 2555142 describes a continuous process for the preparation of polymers of ethylenically unsaturated monomers by the emulsion polymerization process in a plurality of polymerization reactors connected in series. For this purpose, a first reactor is charged with a preemulsion comprising water, initiator, a part of the monomers and further auxiliaries, the dispersion obtained is transferred to a second reaction vessel, the residual proportion of the monomers is then fed in and finally, in a last reaction vessel, the dispersion is completely polymerized by addition of further initiator. At the end of the reactor cascade, a heat exchanger is arranged for cooling the polymer dispersion obtained.

DE-A 2456576 describes a plant configuration consisting of a coolable stirred autoclave for the preparation of the preemulsion comprising monomer, emulsifier, reducing agent and water, a reactor for the main polymerization and a tube for the postpolymerization. The polymerization is carried out in the presence of a redox initiator system, the reducing agent being used in a large excess and the oxidizing agent being metered into the reactor. The monomers are metered in so that the concentration thereof does not exceed a defined limit. The rapid formation of deposits on the wall which leads to low plant availability is disadvantageous in this process. Inter alia, the strongly varying properties of the products are the cause of this.

U.S. Pat. No. 4,164,489 describes a process for the continuous preparation of vinyl acetate-ethylene dispersions, which is distinguished by use of a seed latex which is likewise fed in continuously. A disadvantage is that this seed is an independent product which has to be prepared additionally for this purpose (small particle size, about 200 nm), undesired constituents of the formulation, such as emulsifiers, being entrained into the product.

EP-A 1174445 and EP-A 1323752 describe processes for the continuous preparation of vinyl acetate-ethylene dispersions in at least two pressure-resistant reactors connected in series, the polymerization being initiated with a redox initiator system and the reduction component being fed at least partly to the first pressure-resistant reactor.

Petrocelli et. al. (Polym. Sci. Eng., 80, 544) likewise describe a process using seed latex. In this case too, a finely divided (particle size about 200 nm), emulsifier-stabilized dispersion is used. The basic idea in this seed latex process is the introduction of new latex particles having a small size, which then grow to the desired particle size in the course of the polymerization. Internal new nucleation is to be suppressed by the seed latex.

As a further alternative for increasing the productivity, the literature describes the combination of heat exchangers with batch reactors. In these cases, the batch reactor and the heat exchanger are connected to form a circulation in such a way that the medium to be cooled is fed from the reactor into the heat exchanger and is passed back again from there into the reactor. The additional cooling capacity of the external heat exchanger can be used for reducing the polymerization time. That large amounts of substance have to be transported at high speed through the heat exchanger in order to keep the process efficient is a disadvantage of this principle. The pumps required for this transport process are high-performance pumps with a corresponding high energy and shear load for the medium to be transported.

EP-A 834518 describes a batchwise polymerization process in which the polymerization takes place in a reactor having an external cooling circulation, in which it is essential to use a low-shear pump in order to avoid impairing the products.

WO-A 03/006510 describes a batchwise polymerization process in a polymerization reactor having an external cooling circulation, in which the polymerization batch is circulated by means of a low-shear cylinder or tube diaphragm pump in order to avoid impairing the products by shearing.

WO-A 02/59158 describes a polymerization process in a reactor having an external cooling circulation, in which the polymerization batch is circulated by means of a pump and at least a portion of the monomer has to be metered into the external circulation.

A disadvantage in the case of the batchwise polymerization process in which large-volume batches comprising dispersed polymer particles have to be circulated by pumping is the susceptibility thereof to coagulation owing to the shear forces introduced by the pump.

It was an object of the present invention to develop an economical and technologically improved process for the preparation of vinyl ester-ethylene copolymer dispersions which avoids the variations in the continuous process management and high mechanical loading of the processes with external cooling. It was necessary to take into account problems which can occur not only in the preparation but also during the use of the desired products. Particularly with the use of polymers in the form of their redispersion powders for improving the mortar properties, a main field of use of redispersion powders, the formulations must remain stable over a certain time and must not substantially change their processing consistency (viscosity stability or cement stability). In the concrete and mortar industry, moreover, mechanical properties, such as the compressive strength, the porosity and hence the air void content, play an important role. The hydraulically setting systems treated with dispersion powder should moreover provide even better adhesion compared with the untreated systems. All these product properties must still be guaranteed on changing over from the traditional batch process to the more economical continuous process.

SUMMARY OF THE INVENTION

Surprisingly, it has now been found that, on combining the "continuous polymerization" and "external cooling via heat exchanger" procedures, with arrangement of the heat exchanger before the reactors, it is possible to obtain a process which avoids the respective disadvantages of the individual processes, can be operated in a highly cost-efficient manner and gives products having desired properties.

BRIEF DESCRIPTION OF THE DRAWING

The drawing shows a schematic representation of a reactor system according to the invention.

DETAILED DESCRIPTION OF THE INVENTION

The invention relates to a process for the preparation of polymers based on vinyl esters, ethylene and optionally further comonomers in the form of their aqueous polymer dispersions or water-redispersible polymer powder by means of free radical continuous emulsion polymerization and optionally drying of the polymer dispersion obtained, characterized in that the emulsion polymerization is carried out in a cascade comprising a) at least one upstream heat exchanger and
b) at least two stirred-tank pressure-resistant reactors connected in series,
in such a way that the conversion on leaving the heat exchanger is at least 10% of the total polymerization conversion.

By means of the arrangement according to the invention, the problems of variation when the process is carried out continuously in pure stirred-tank cascades are avoided as are the high shear loads due to the continuous circulation by pumping in the case of use of external heat exchangers. The mixture of substances which is to be polymerized passes through the upstream heat exchanger up to the required reaction conversion and then enters the stirred-tank cascade. This is then further operated in the traditional manner.

The plant configuration according to the invention also has a substantially higher specific plant performance, measured in dispersion [kg]/(time [h]×reactor volume [l]), in comparison with the known continuous polymerization in pure stirred-tank cascades.

The heat exchanger used may comprise all known technologies, for example plate-type heat exchangers, tubular heat exchangers, tube-bundle heat exchangers, spiral heat exchangers, static mixer heat exchangers. A tubular heat exchanger or tube-bundle heat exchanger is preferred.

Suitable pressure-resistant reactors (stirred tanks) and pressureless reactor are appropriately dimensioned steel reactors which are equipped with the customary stirring devices, heating and cooling systems, instrumentation and pipes for feeding and removing starting materials or products.

The polymerization is carried out in a cascade comprising at least one heat exchanger and at least two pressure-resistant reactors (stirred tanks) connected in series and then continued in at least one pressureless reactor. The preferred plant configuration after the heat exchanger or heat exchangers consists of two pressure-resistant reactors connected in series and one or two downstream pressureless reactors. If a plurality of pressureless reactors are used, these may be operated both alternately (side by side) and one behind the other (in series). Larger cascades having more than two pressure-resistant reactors can be used but, owing to the sharply increasing complexity of the plant which is associated therewith, are not always desirable.

The process is carried out in such a way that, in the entire plant chain (heat exchanger and pressure-resistant reactors), the sum of the incoming mass flows is equal to the sum of the outgoing mass flows. In the case of a plurality of pressureless reactors, these are preferably operated side by side and are used alternately. The pressure in the plant chain is adjusted so that a decreasing pressure gradient results from the first to the last of the apparatuses connected in series, which pressure gradient ensures the mass flow in the pressure-resistant reactor cascade. The mass transport from the last pressure-resistant reactor into the pressureless reactor connected downstream thereof can be effected by means of pressure-regulated valves or by means of a pump at a rate at which the mass flows are fed into the upstream pressure-resistant reactors.

Before the beginning of the polymerization, the pressure-resistant reactors are filled to 50 to 80% of the volume with a polymer dispersion which corresponds to the end product of the polymerization with regard to copolymer composition, type and amount of protective colloid and particle size and solids content. This can be effected so that this dispersion is prepared in the pressure-resistant reactors by means of batch polymerization or the pressure-resistant reactors are filled with a separately prepared dispersion.

The heat exchangers and the pressure-resistant reactors are then fed with an amount of ethylene such that polymerization is effected at a pressure p1 of, preferably, 30 to 80 bar in the heat exchanger and first pressure-resistant reactor and at a pressure p2 of, preferably, 10 to 40 bar in the last pressure-resistant reactor, with the proviso that p1>p2. The ethylene pressure is regulated so that a decreasing pressure gradient results from the first to the last of the apparatuses connected in series. Preferably, the pressure difference between two apparatuses connected in series is 2 to 40 bar. Thus, the pressure difference between the apparatuses acts as a driving force for the mass flow during the continuous polymerization.

The starting materials of the polymerization batch can be mixed completely or partly in an upstream mixing unit, for example a preemulsion reactor, before the heat exchanger and then fed to the heat exchanger and optionally to the pressure-resistant reactors.

The monomers can be metered in as a whole via the heat exchanger or can be divided between the heat exchanger and the pressure-resistant reactors. In a preferred procedure, 50 to 100% by weight, in particular more than 70% by weight, based on the total weight, of the vinyl ester monomers and optionally further comonomers are metered in via the heat exchanger and the remainder is metered into subsequent pressure-resistant reactors. Preferably, at least 50% by weight of the ethylene are initially introduced into the heat exchanger.

The proportion of protective colloid can be either initially introduced completely before the heat exchanger, i.e. in an upstream mixing unit, or partly metered into the first pressure-resistant reactor and the remainder can be metered into further pressure-resistant reactors. Preferably, at least 70% by weight of the protective colloid is fed in before the heat exchanger or into the heat exchanger; particularly preferably, the proportion of protective colloid is fed in completely before the heat exchanger or into the heat exchanger.

The polymerization is initiated with a redox system comprising oxidizing and reducing component, the reducing component preferably being fed in completely before the heat exchanger and the oxidizing component being fed in before the heat exchanger and metered into all pressure-resistant reactors. The monomer conversion is controlled with the initiator dose.

The meterings can be carried out separately (spatially and with respect to time) or all or some of the components to be metered can be metered in preemulsified form.

The initiators are metered in as a whole so that a continuous polymerization is ensured, and the polymerization conversion when it emerges from the heat exchanger is $\geq 10\%$, preferably $\geq 15\%$, particularly preferably $\geq 20\%$. The remaining monomer mixture is polymerized in the following stirred-tank cascade to the desired conversion. Preferably, polymerization is effected to a residual monomer content of 10 to 20% by weight in the first pressure-resistant reactor and to a residual monomer content of $\leq 5\%$ by weight in the last pressure-resistant reactor, based in each case on the total weight of the monomers.

The residence time $t_w$ of the mixture of substances in the heat exchanger is of an order of magnitude similar to that of the residence time $t_R$ in an individual reactor in the following cascade; accordingly, the dimension of the heat exchanger is to be chosen in order to achieve the required conversion. Preferably, the residence time $t_w$ is between 0.8 $t_R$ and 0.4 $t_R$; particularly preferably, it is between 0.4 $t_R$ and 0.2 $t_R$. Preferred feeding of the reducing component exclusively at the beginning of the reactor sequence leads to a low total initiator consumption and to better mechanical properties of the dispersion films. Overall, the metering rates of the starting materials are preferably adjusted so that average residence times in the pressure-resistant reactor cascade of altogether 60 to 180 minutes per individual reactor result.

After the end of the polymerization in the pressure-resistant reactors, postpolymerization is effected with the use of known methods in the pressureless reactor for removing the residual monomers, in general by postpolymerization initiated with a redox catalyst. In the pressureless reactors, both initiator components are therefore added to the required extent for the final compounding. Volatile residual monomers can also be removed by means of distillation, preferably under reduced pressure, and optionally while passing through or passing over inert entraining gases, such as air, nitrogen or steam.

Suitable vinyl esters are those of carboxylic acids having 1 to 18 C atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, preferably VeoVa9$^R$ or VeoVa10$^R$ (registered trade name of Hexion). Vinyl acetate is particularly preferred. Said vinyl esters are copolymerized in general in an amount of 30 to 90% by weight, based on the total weight of the monomers.

Ethylene is copolymerized in general in an amount of 1 to 40% by weight, based on the total weight of the monomers.

Suitable further comonomers are those from the group consisting of the esters of acrylic acid or methacrylic acid, of the vinyl halides, such as vinyl chloride, of the olefins, such as propylene. Suitable methacrylates or acrylates are esters of straight-chain or branched alcohols having 1 to 15 C atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Methyl acrylate, methyl methacrylate, n-butyl acrylate and 2-ethylhexyl acrylate are preferred. These comonomers are optionally copolymerized in an amount of 1 to 40% by weight, based on the total weight of the monomers.

Optionally, 0.05 to 10% by weight, based on the total weight of the monomer mixture, of further monomers (auxiliary monomers) can also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as diethyl and diisopropyl esters, and maleic anhydride, ethylenically unsaturated sulphonic acids or salts thereof, preferably vinylsulphonic acid, 2-acrylamido-2-methylpropanesulphonic acid. Further examples are precrosslinking comonomers, such as polyethylenically unsaturated comonomers, for example divinyl adipate, diallyl maleate, allyl methacrylate or triallyl cyanurate, or postcrosslinking comonomers, for example acryl-amidoglycolic acid (AGA), methylacrylamidoglycolic acid methyl ester (MAGME), N-methylolacrylamide (NMA), N-methylolmethacrylamide (NMMA), N-methylolallyl carbamate, alkyl ethers, such as the isobutoxy ether, or esters of N-methylolacrylamide, the N-methylolmethacrylamide and the N-methylolallyl carbamate.

Epoxide-functional comonomers, such as glycidyl methacrylate and glycidyl acrylate, are also suitable. Further examples are silicon-functional comonomers, such as acryloxypropyltri(alkoxy)- and methacryloxypropyltri(alkoxy) silanes, vinyltrialkoxysilanes and vinylmethyldialkoxysilanes, it being possible, for example, for methoxy, ethoxy and ethoxypropylene glycol ether radicals to be present as alkoxy groups. Monomers having hydroxyl or CO groups may also be mentioned, for example hydroxyalkyl methacrylates and acrylates such as hydroxyethyl, hydroxypropyl or hydroxybutyl acrylate or methacrylate, and compounds such as diacetonacrylamide and acetylacetoxyethyl acrylate or methacrylate.

Comonomer mixtures of vinyl acetate with 1 to 40% by weight of ethylene; and
comonomer mixtures of vinyl acetate with 1 to 40% by weight of ethylene and 1 to 50% by weight of one or more further comonomers from the group consisting of the vinyl esters having 1 to 18 C atoms in the carboxylic acid radical, such as vinyl propionate, vinyl laurate, vinyl esters of alpha-branched carboxylic acids having 9 to 11 C atoms, such as VeoVa9, VeoVa10, VeoVa11; and
mixtures of vinyl acetate, 1 to 40% by weight of ethylene and preferably 1 to 60% by weight of acrylates of straight-chain or branched alcohols having 1 to 15 C atoms, in particular n-butyl acrylate or 2-ethylhexyl acrylate; and
mixtures with 30 to 75% by weight of vinyl acetate, 1 to 30% by weight of vinyl laurate or vinyl esters of an alpha-branched carboxylic acid having 9 to 11 C atoms, and 1 to 30% by weight of acrylates of straight-chain or branched alcohols having 1 to 15 C atoms, in particular n-butyl acrylate or 2-ethylhexyl acrylate, which also contain 1 to 40% by weight of ethylene; and mixtures with vinyl acetate, 1 to 40% by weight of ethylene and 1 to 60% by weight of vinyl chloride are preferred, it also being possible for the mixtures to contain said auxiliary monomers in said amounts, and the data in % by weight in each case summing to 100% by weight.

The choice, of the monomers or the choice of the proportions by weight of the comonomers is made so that in general a glass transition temperature Tg of $-50°$ C. to $+50°$ C., preferably of $-20°$ C. to $+30°$ C., results. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956), the following is true: $1/Tg=x_1/Tg_1+x_2/Tg_2+\ldots+x_n/Tg_n$, where $x_n$ represents the mass fraction (% by weight/100) of the monomer n, and $Tg_n$ is the glass transition temperature in Kelvin of the homopolymer of the monomer n. Tg values for homopolymers are shown in Polymer Handbook 2nd Edition, J. Wiley & Sons, New York (1975).

The polymerization is effected by the emulsion polymerization process, the polymerization temperature being in general $40°$ C. to $100°$ C., preferably $60°$ C. to $90°$ C. The polymerization is initiated with the redox initiator combinations customary for the emulsion polymerization. Examples of suitable oxidation initiators are the sodium, potassium and ammonium salts of peroxodisulphuric acid, hydrogen peroxide, tert-butyl peroxide, tert-butyl hydroperoxide, potassium peroxodiphosphate, tert-butyl peroxopivalate, cumyl hydroperoxide, isopropylbenzene monohydroperoxide and azobisisobutyronitrile. The sodium, potassium and ammonium salts of peroxodisulphuric acid and hydrogen peroxide are preferred. Said initiators are used in general in an amount of 0.01 to 2.0% by weight, based on the total weight of the monomers.

Suitable reducing agents are the sulphites and bisulphites of the alkali metals and of ammonium, for example sodium sulphite, the derivatives of sulphoxylic acid, such as zinc or alkali metal formaldehyde sulphoxylates, for example sodium hydroxymethanesulphinate (Brüggolit) and (iso) ascorbic acid. Sodium hydroxymethanesulphinate and (iso) ascorbic acid are preferred. The amount of reducing agent is preferably 0.015 to 3% by weight, based on the total weight of the monomers.

For controlling the molecular weight, regulating substances may be used during the polymerization. If regulators are used, these are usually employed in amounts between 0.01 and 5.0% by weight, based on the monomers to be polymerized, and are metered separately or premixed with reaction components. Examples of such substances are n-dodecyl mercaptan, tert-dodecyl mercaptan, mercaptopropionic acid, methyl mercaptopropionate, isopropanol and acetaldehyde. Preferably, no regulating substances are used.

Polymerization is preferably effected in the presence of protective colloids. Suitable protective colloids are partly hydrolysed polyvinyl alcohols; polyvinylpyrrolidones; polyvinyl acetals; polysaccharides in water-soluble form, such as starches (amylose and amylopectin), celluloses and the carboxymethyl, methyl, hydroxyethyl and hydroxypropyl derivatives thereof; proteins, such as casein or caseinate, soya protein, gelatin; ligninsulphonates; synthetic polymers, such as poly(meth)acrylic acid, copolymers of (meth)acrylates with carboxy-functional comonomer units, poly(meth)acrylamide, polyvinylsulphonic acids and the water-soluble copolymers thereof; melamine formaldehyde sulphonates, naphthalene formaldehyde sulphonates, styrene-maleic acid and vinyl ether maleic acid copolymers; cationic polymers, such as poly-DADMAC.

Preferred protective colloids are partly hydrolysed or completely hydrolysed polyvinyl alcohols. Partly hydrolysed polyvinyl alcohols having a degree of hydrolysis of 80 to 95 mol % and a Happier viscosity, in 4% strength aqueous solution, of 1 to 30 mPas (Höppler method at 20° C., DIN 53015) are particularly preferred. Partly hydrolysed, hydrophobically modified polyvinyl alcohols having a degree of hydrolysis of 80 to 95 mol % and a Floppier viscosity, in 4% strength aqueous solution, of 1 to 30 mPas are also particularly preferred. Examples of these are partly hydrolysed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates, such as diisopropyl maleate and diisopropyl fumarate, vinyl chloride, vinyl alkyl ethers, such as vinyl butyl ether, olefins, such as ethene and decene. The proportion of the hydrophobic units is preferably 0.1 to 10% by weight, based on the total weight of the partly hydrolysed polyvinyl alcohol. It is also possible to use mixtures of said polyvinyl alcohols.

Further particularly preferred polyvinyl alcohols are partially hydrolysed, hydrophobized polyvinyl alcohols which are obtained by polymer-analogous reaction, for example acetalation of the vinyl alcohol units with $C_1$- to $C_4$-aldehydes, such as butyraldehyde. The proportion of the hydrophobic units is preferably 0.1 to 10% by weight, based on the total weight of the partly hydrolysed polyvinyl acetate. The degree of hydrolysis is from 80 to 95 mol %, preferably 85 to 94 mol %, and the Höppler viscosity (DIN 53015, Höppler method, 4% strength aqueous solution) is from 1 to 30 mPas, preferably 2 to 25 mPas.

Most preferred are polyvinyl alcohols having a degree of hydrolysis of 85 to 94 mol % and a Höppler viscosity, in 4% strength aqueous solution, of 3 to 15 mPas (Höppler method at 20° C., DIN 53015). Said protective colloids are obtainable by means of methods known to the person skilled in the art.

The polyvinyl alcohols are generally added in an amount of altogether 1 to 20% by weight, based on the total weight of the monomers, during the polymerization.

In the method according to the invention, polymerization is preferably effected without addition of emulsifiers. In exceptional cases, it may be advantageous to use emulsifiers, optionally 1 to 10% by weight, based on the amount of monomers. Suitable emulsifiers are anionic, cationic and nonionic emulsifiers, for example anionic surfactants, such as alkyl sulphates having a chain length of 8 to 18 C atoms, alkyl or alkylaryl ether sulphates having 8 to 18 C atoms in the hydrophobic radical and up to 40 ethylene oxide or propylene oxide units, alkylsulphonates or alkylarylsulphonates having 8 to 18 C atoms, esters and monoesters of sulphosuccinic acid with monohydric alcohols or alkylphenols, or nonionic surfactants, such as alkyl polyglycol ethers or alkylaryl polyglycol ethers having 8 to 40 ethylene oxide units.

The aqueous dispersions obtainable by the process according to the invention have a solids content of 30 to 75% by weight, preferably of 50 to 60% by weight. For the preparation of the polymer powders redispersible in water, the aqueous dispersions are dried, optionally after addition of protective colloids as drying aids, for example by means of fluidized-bed drying, freeze drying or spray drying. Preferably, the dispersions are spray-dried. The spray dying is effected in customary spray drying units, it being possible to effect the atomization by means of airless-pressure nozzles, binary nozzles or multi-medium nozzles or with a rotating disc. The exit temperature is generally chosen in the range from 45° C. to 120° C., preferably 60° C. to 90° C., depending on the plant, Tg of the resin and desired degree of drying.

As a rule, the drying aid is used in a total amount of 3 to 30% by weight, based on the polymeric constituents of the dispersion. This means that the total amount of protective colloid before the drying process should be at least 3 to 30% by weight, based on the proportion of polymer; 5 to 20% by weight, based on the proportion of polymer, are preferably used.

Suitable drying aids are partly hydrolysed polyvinyl alcohols; polyvinylpyrrolidones; polyvinyl acetals; polysaccharides in water-soluble form, such as starches (amylose and amylopectin), celluloses and the carboxymethyl, methyl, hydroxyethyl and hydroxypropyl derivatives thereof; proteins, such as casein or caseinate, soya protein, gelatin; lignin sulphonates; synthetic polymers, such as poly(meth)acrylic acid, copolymers of (meth)acrylates with carboxy-functional comonomer units, poly(meth)acrylamide, polyvinylsulphonic acids and the water-soluble copolymers thereof; melamine formaldehyde sulphonates, naphthalene formaldehyde sulphonates, styrene-maleic acid and vinyl ether maleic acid copolymers; cationic polymers, such as poly-DADMAC. Preferably, no further protective colloids other then polyvinyl alcohols are used as a drying aid.

In the case of the atomization, a content of up to 1.5% by weight of antifoam, based on the base polymer, has often proved to be advantageous. For increasing the storability by improving the stability to blocking, particularly in the case of powders having a low glass transition temperature, the powder obtained can be treated with an antiblocking agent (anticaking agent), preferably up to 30% by weight, based on the total weight of polymeric constituents. Examples of antiblocking agents are Ca- or Mg carbonate, talc, gypsum, silica, kaolins, metakaolin, silicates having particle sizes preferably in the range from 10 nm to 10 μm.

The viscosity of the feed to be atomized is adjusted via the solids content so that a value of <500 mPas (Brookfield viscosity at 20 revolutions and 23° C.), preferably <250 mPas, is obtained. The solids content of the dispersion to be atomized is >35%, preferably >40%.

For improving the performance characteristics, further additives may be added during the atomization. Further constituents of dispersion powder compositions, which constituents are present in preferred embodiments, are, for example, pigments, fillers, foam stabilizers and water repellents.

The aqueous polymer dispersions and the protective colloid-stabilized polymer powders redispersible in water can be used in the applications typical for them, for example in construction chemistry products, optionally in combination with hydraulically setting binders, such as cements (Portland, alumina, trass, slag, magnesia or phosphate cement), gypsum and waterglass, for the production of construction adhesives, in particular tile adhesives and complete lagging adhesives, renders, filling compounds, floor filling compounds, levelling compounds, grouts, joint mortars and paints, furthermore as binders for coating materials and adhesives or else coating materials or binders for textiles and paper.

The following examples serve for further explanation of the invention:

The drawing shows a reactor system comprising an upstream mixing unit VE for the preparation of the preemulsion, a tubular heat exchanger R1 and two stirred-tank pressure-resistant reactors R2 and R3 and the pressureless reactor R4 for removing the residual monomers. In the example and comparative example, this plant was dimensioned as follows: the heat exchanger was a tubular heat exchanger having an overall tube length of 84 m and an internal tube diameter of 9 mm; the volume of the heat exchanger was thus about 5 liters. The two stirred-tank pressure-resistant reactors each had a volume of about 18 liters, a stirrer and a coolable jacket. All apparatuses were designed for a useable pressure range up to 80 bar.

EXAMPLE

In the preemulsion reactor VE, the aqueous phase comprising 74 kg of a 20% strength solution of a polyvinyl alcohol having a degree of hydrolysis of 88 mol % and a Höppler viscosity of 4 mPas, 98 kg of water and the organic phase consisting of 182 kg of vinyl acetate and 50 kg of ethylene were mixed. The pH was adjusted to 4.0 with 50 g of formic acid, and 230 g of Brüggolit and 20 g of iron ammonium sulphate were added. The mixture was heated to 65° C.

In each case 15 kg of an aqueous dispersion of a vinyl acetate-ethylene copolymer comprising 83% by weight of vinyl acetate and 17% by weight of ethylene, which was stabilized with 7% by weight, based on copolymer, of a polyvinyl alcohol having degree of hydrolysis of 88 mol % and a Höppler viscosity of 4 mPas, were initially introduced into the reactors R2 and R3, each having a volume of 18 l. The homogenized mixture was fed from the storage container VE at flow rate of 12 kg/h into the reactor system. For this purpose, the mixture is passed into the tubular heat exchanger R1 and, after leaving the heat exchanger, into the reactor R2 and from there into the reactor R3. After the reactor R3, the dispersion was let down into the pressureless reactor R4 and excess ethylene was separated off.

Before the mixture entered the tubular heat exchanger, the initiator potassium persulphate (3% strength by weight solution in water) was fed in at rate of 80 g/h via further metering. 100 g/h of potassium persulphate (3% strength by weight solution in water) were metered into the reactor R2. 180 g/h of potassium persulphate (3% strength by weight solution in water) were metered into the reactor R3.

The prepared dispersion was transported by means of a pump from the pressure-resistant reactor R3 into the pressureless reactor R4 and subjected there to postpolymerization with 50 ml of tert-butyl hydroperoxide (10% strength by weight solution in water) and 50 ml of Brüggolit (10% strength by weight solution in water) per 10 kg of dispersion.

The conversion in the polymerization was about 25% on leaving the heat exchanger and 65% and 92% on leaving the reactor R2 and R3, respectively. The polymerization was carried out over a duration of 80 hours.

A dispersion forming a solids content of 53.1%, a viscosity of 160 mPas (Brookfield 20 at 23° C.), a pH of 3.4, a Tg of −6° C. and a particle diameter Dw of 1240 nm was obtained. The particle size distribution was stable over the duration of the experiment. No formation of deposits in the wall was observed. The sieve residue on sieving above 250 μm was 270 ppm (mg/kg). The K value was 124. The free residual monomer was <430 ppm. The dispersion was stable in cement.

Comparative Example

The continuous polymerization was carried out according to Example 1 of EP-A 1174445.

A dispersion having a solids content of 50.7%, of viscosity of 90 mPas (Brookfield 20 at 23° C.), a pH of 3.8, a Tg of about −6° C. and a particle diameter Dw of 1350 nm was obtained. The particle size distribution was stable over the duration of the experiment. No formation of deposits on the wall was observed. The sieve residue on sieving above 250 μm was 380 ppm (mg/kg). The K value was 105. The free residual monomer was <390 ppm. The dispersion was stable in cement.

Comparison of the Molecular Weight Via K Value:

The K values were measured on the basis of DIN EN ISO 1628-2.

| K value | |
| --- | --- |
| Example | 124 |
| Comparative example | 105 |

Comparison of the Insoluble Fraction:

A film having a layer thickness of about 300 μm (dry) is produced from the dispersion. An approx. 1 g piece (sample weight A) of the dried film is dissolved in 50 ml of ethyl acetate. This solution is heated to the boil for 6 h and cooled again. The undissolved constituents are filtered off from the solution, and the solvent is then distilled off. The residue (sample weight B) is the soluble fraction and is determined gravimetrically. The insoluble fraction in % is obtained from (A−B)/A×100.

| Insoluble fraction | |
| --- | --- |
| Example | 62% |
| Comparative example | 69% |

DISCUSSION

The results show that higher linear molecular weights (K values) and smaller fractions of crosslinked, i.e. insoluble, polymers are obtained by the process according to the invention.

The invention claimed is:

1. A process for the preparation of a polymer, comprising free radical continuous emulsion polymerization of comonomers comprising vinyl esters, ethylene and optionally additional comonomers to form an aqueous dispersion of the polymer, and optionally drying the aqueous dispersion of the polymer to form a water-redispersible polymer powder, wherein the emulsion polymerization is carried out in a cascade comprising the following apparatuses
   a) at least one upstream heat exchanger,
   b) at least two stirred-tank pressure-resistant reactors connected in series, and
   c) then at least one pressureless reactor,
   in such a way that conversion upon leaving the heat exchanger is at least 10% of the total polymerization conversion, and
   a decreasing pressure gradient results from the first apparatus in the cascade to the last apparatus in the cascade, and after the end of the polymerization in the pressure-resistant reactors, postpolymerization is effected in the pressureless reactor.

2. The process according to claim 1, wherein the residence time $t_w$ in the heat exchanger is between 0.8 and 0.2 residence time $t_R$ of the reactor.

3. The process according to claim 1, further comprising adding a protective colloid, wherein before the beginning of the polymerization, the pressure-resistant reactors are filled to 50 to 80% of the volume with a polymer dispersion which corresponds to the end product of the polymerization with regard to copolymer composition, type and amount of protective colloid and particle size and solids content.

4. The process according to claim 1, wherein the starting materials of the polymerization batch are mixed completely or partly in an upstream mixing unit and then fed into the heat exchanger.

5. The process according to claim 1, wherein the pressure-resistant reactors are fed with an amount of ethylene such that polymerization is effected at a pressure of 30 to 80 bar in the heat exchanger and the first pressure-resistant reactor and at a pressure of 10 to 40 bar in the last pressure-resistant reactor, and the ethylene pressure is regulated so that a decreasing pressure gradient results from the first to the last of the pressure-resistant reactors connected in series.

6. The process according to claim 1, wherein 50 to 100% by weight, based on the total weight, of the vinyl ester monomers and optionally additional comonomers, except for ethylene, are metered into the heat exchanger, the remainder is metered into subsequent pressure-resistant reactors, and at least 50% by weight of the ethylene charged to the process is initially introduced into the heat exchanger.

7. The process according to claim 1, wherein at least 70% by weight of the protective colloid is initially introduced before the heat exchanger or in the heat exchanger.

8. The process according to claim 1, wherein the initiators for the polymerization are metered in so that the polymerization is carried out to a residual monomer content of ≦20% by weight in the first pressure-resistant reactor and to a residual monomer content of ≦5% by weight in the last pressure-resistant reactor, based in each case on the total weight of the monomers.

9. The process according to claim 1, wherein polymerization is effected with average residence times of altogether 60 to 180 minutes in the pressure-resistant reactor cascade.

10. The process according to claim 1, wherein polymer has a glass transition temperature Tg in a range from −20° C. to +30° C.

11. The process according to claim 1, wherein the aqueous dispersion obtained thereby is dried by means of spray drying, optionally after addition of protective colloid as an atomization aid.

12. A device for carrying out the process according to claim 1, comprising apparatuses including at least one upstream heat exchanger and at least two stirred-tank pressure-resistant reactors all connected in series, wherein a decreasing pressure gradient results from the first to the last of the apparatuses connected in series, and at least one pressureless reactor is arranged behind the stirred-tank pressure-resistant reactors.

13. The device according to claim 12, wherein a mixing unit is located upstream of the heat exchanger.

14. The device according to claim 12, wherein the heat exchanger is a tubular heat exchanger.

* * * * *